Patented May 26, 1925.

1,539,353

UNITED STATES PATENT OFFICE.

HERMANN FRITZSCHE, OF BASEL, SWITZERLAND, ASSIGNOR TO SOCIETY OF CHEMICAL INDUSTRY IN BASLE, OF BASEL, SWITZERLAND.

AZO DYESTUFFS AND PROCESS OF MAKING SAME.

No Drawing.    Application filed July 12, 1924.   Serial No. 725,695.

*To all whom it may concern:*

Be it known that I, HERMANN FRITZSCHE, a citizen of the Swiss Confederation, and residing at Basel, Switzerland, have invented new and useful Azo Dyestuffs and Processes of Making Same, of which the following is a full, clear, and exact specification.

The present invention relates to new dyestuffs which yield valuable shades on the fibre. The invention comprises the new dyestuffs, the method of making same, as well as the material dyed with the new dyestuffs.

It has been found that new substantive polyazo-dyestuffs are obtained by reacting on two molecular proportions of 1-aminoaryl-5-pyrazolones, in any desired sequence, with 1 molecular proportion of phosgene and two molecular proportions of diazotized azo-dyestuffs. There are thus obtained dyestuffs of the general formula:

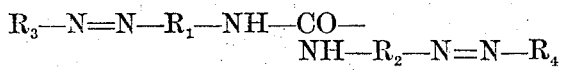

wherein $R_1$ and $R_2$ represent arylpyrazolone radicals in which the NH-group is attached to the aryl nucleus and the —N=N-group to the pyrazoline nucleus, and $R_3$ and $R_4$ signify radicals of azo-dyestuffs which contain at least one azo-chromophor. They form brown-red to brown-black powders which dye unmordanted cotton yellow to red and brown tints which may be discharged with hydrosulfite to a pure white.

The invention is illustrated by the following examples, the parts being by weight:—

*Example 1.*

Into a solution of 219 parts of 1:3'-aminophenyl-5-pyrazolone-3-carboxylic acid and 150 parts of calcined sodium carbonate in 3000 parts of water phosgene is introduced at a temperature of about 40–50° C. until a test sample can no longer be diazotized. The urea derivative thus formed may be precipitated on adding mineral acid until the mixture just shows an acid action. It is a white powder which is sparingly soluble in water and alcohol, but easily soluble in alkalies and concentrated sulphuric acid.

232 parts of this new intermediate product are now dissolved in 3000 parts of water, while adding 170 parts of calcined sodium carbonate or 40 parts of caustic soda and 150 parts of crystallized sodium acetate. The mass is cooled with ice to about 5° C. and there is then allowed to flow in a suspension of the diazo-compound prepared from 305 parts of 4-amino-3-toluene-azo-2'-toluene-4'-sulfonic acid. The dyestuff thus formed is precipitated in the cold by means of common salt, filtered and dried. It is a brown-red powder which dyes cotton orange-colored tints which are very fast to light and which are dischargeable with hydrosulfite to a pure white.

The new dyestuff corresponds very probably with the formula

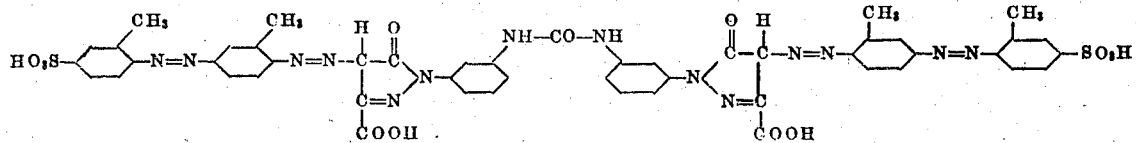

*Example 2.*

219 parts of 1:3'-aminophenyl-5-pyrazolone-3-carboxylic acid are dissolved in 3000 parts of water, while adding 170 parts of calcined sodium carbonate or 40 parts of caustic soda and 150 parts of crystallized sodium acetate. The mass is cooled with ice to about 5° C., and there is then allowed to flow in a suspension of the diazo-compound prepared from 305 parts of 4-amino-3-toluene-azo-2'-toluene-4-sulfonic acid. The dyestuff formed is precipitated in the cold by means of common salt, filtered, dissolved in 10000 parts of water and 200 parts of calcined sodium carbonate, and finally treated at the ordinary temperature with phosgene until a test sample is no longer diazotizable. The dyestuff which has separated on addition of common salt is identical with the one described in Example 1.

Example 3.

Into the solution, made alkaline with sodium carbonate, of the disazo-dyestuff which has been prepared by coupling 305 parts of diazotized 4-amino-3-toluene-azo-2'-toluene-4'-sulfonic acid with 464 parts of the urea of 1:3'-aminophenyl-5-pyrazolone-3-carboxylic acid made as described in Example 1, there is allowed to run in the diazo-compound prepared by diazotizing 691 parts of the aminodisazo-dyestuff which has been obtained by coupling diazotized 2-amino-naphthalene-4:8-disulfonic acid with α-naphthylamine, repeated diazotization and coupling with 1-aminonaphthalene-6-sulfonic acid.

The dyestuff isolated in the usual manner dyes unmordanted cotton brown tints, fast to light, which are dischargeable with hydrosulfite to white.

The new dyestuff corresponds very probably with the formula

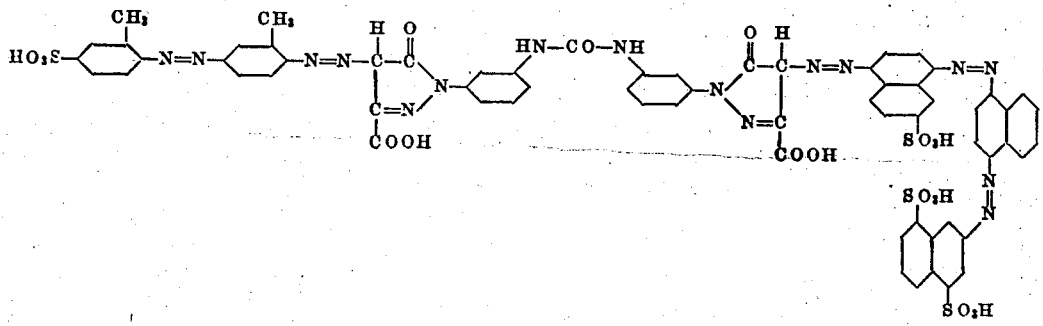

Example 4.

189 parts of 1:3'-aminophenyl-3-methyl-5-pyrazolone are dissolved in about 3000 parts of water and 40 parts of caustic soda. Into the solution, to which previously there have been added 140 parts of crystallized sodium acetate, phosgene is introduced at a temperature of about 40° C. until no diazotizable amino-group is any longer present. In order that no reaction occurs which is acid to congo, calcined sodium carbonate is added. The urea derivative formed is precipitated by acidification, and filtered. It is a white powder which is sparingly soluble in water, but easily soluble in alkalies and also in concentrated sulphuric acid.

A solution of 202 parts of the new compound in about 3000 parts of water and 40 parts of caustic soda is allowed to run into a neutralized suspension of the diazo-compound prepared from 305 parts of 4-amino-3-toluene-azo-2'-toluene-4'-sulfonic acid at a temperature of about 5° C., to which there have previously been added 140 parts of crystallized sodium acetate. After the combination is accomplished the whole is rendered alkaline to sodium carbonate and the dyestuff formed is precipitated hot with common salt and filtered. It is an orange-brown powder which dyes cotton yellow-orange tints which are fast to light. The dyeings are dischargeable by means of hydrosulfite.

In an analogous manner there are obtained a dyestuff dyeing brown-orange from 1:4'-aminophenyl-5-pyrazolone-3-carboxylic acid, phosgene, and 4-amino-azo-benzene-3'-sulfonic acid, or a dyestuff dyeing yellowish-red from 1:4'-aminophenyl-5-pyrazolone-3-carboxylic acid, phosgene, and 4-amino-3-methoxy-phenyl-azo-2'-toluene-4'-sulfonic acid.

What I claim is:—

1. The process for the manufacture of substantive azo-dyestuffs, consisting in reacting on two molecular proportions of 1-amino-aryl-5-pyrazolones, in any desired sequence, with one molecular proportion of phosgene and two molecular proportions of diazotized azo-dyestuffs which contain at least one azo-group.

2. The process for the manufacture of substantive azo-dyestuffs, consisting in reacting on two molecular proportions of 1-amino-aryl-5-pyrazolone-3-carboxylic acid, in any desired sequence, with one molecular proportion of phosgene and two molecular proportions of diazotized azo-dyestuffs which contain at least one azo-group.

3. The process for the manufacture of substantive azo-dyestuffs, consisting in reacting on two molecular proportions of 1:3'-aminophenyl-5-pyrazolone-3-carboxylic acid, in any desired sequence, with one molecular proportion of phosgene and two molecular proportions of diazotized azo-dyestuffs which contain at least one azo-group.

4. The process for the manufacture of substantive azo-dyestuffs, consisting in reacting on two molecular proportions of 1:3'-aminophenyl-5-pyrazolone-3-carboxylic acid, in any desired sequence, with one molecular proportion of phosgene and two molecular proportions of diazotized mono-azo-dyestuffs.

5. As new products the substantive polyazo-dyestuffs of the general formula $$R_3-N=N-R_1-NH-CO-NH-R_2-N=N-R_4$$

wherein $R_1$ and $R_2$ represent aryl-5-pyrazolone radicals in which the —NH-group is attached to the aryl nucleus and the —N=N-group to the pyrazolone nucleus, and wherein $R_3$ and $R_4$ signify radicals of azo-dyestuffs which contain at least one azo-chromophor, which dyestuffs form brown-red to brown-black powders which dye unmordanted cotton yellow to brown and red shades which are fast to light.

6. As new products the substantive polyazo-dyestuffs of the general formula $$R_3-N=N-R_1-NH-CO-NH-R_2-N=N-R_4$$

wherein $R_1$ and $R_2$ represent aryl-5-pyrazolone-3-carboxylic acid radicals in which the —NH-group is attached to the aryl nucleus and the —N=N-group to the pyrazolone nucleus, and wherein $R_3$ and $R_4$ signify radicals of azo-dyestuffs which contain at least one azo-chromophor, which dyestuffs form brown-red to brown-black powders which dye unmordanted cotton yellow to brown and red shade which are fast to light.

7. As new products the substantive polyazo-dyestuffs of the general formula $$R_3-N=N-R_1-NH-CO-NH-R_2-N=N-R_4$$

wherein $R_1$ and $R_2$ represent phenyl-5-pyrazolone-3-carboxylic acid radicals in which the —NH-group is attached to the 3'-position of the phenyl nucleus and the —N=N-group to the pyrazolone nucleus, and wherein $R_3$ and $R_4$ signify radicals of azo-dyestuffs which contain at least one azo-chromophor, which dyestuffs form brown-red to brown-black powders which dye unmordanted cotton yellow to brown and red shades which are fast to light, and which are dischargeable with hydrosulfite to a pure white.

8. As new products the substantive polyazo-dyestuffs of the general formula $$R_3-N=N-R_1-NH-CO-NH-R_2-N=N-R_4$$

wherein $R_1$ and $R_2$ represent phenyl-5-pyrazolone-3-carboxylic acid radicals in which the —NH-group is attached to the 3'-position of the phenyl-nucleus and the —N=N-group to the pyrazolone nucleus, and wherein $R_3$ and $R_4$ signify radicals of mono-azo-dyestuffs which contain one azo-chromophor, which dyestuffs form brown-red to brown-black powders which dye unmordanted cotton yellow to brown and red shades which are fast to light, and which are dischargeable with hydrosulfite to a pure white.

9. The material dyed with the dyestuffs of claim 5.

10. The material dyed with the dyestuffs of claim 6.

11. The material dyed with the dyestuffs of claim 7.

12. The material dyed with the dyestuffs of claim 8.

In witness whereof I have hereunto signed my name this 27th day of June, 1924, in the presence of two subscribing witnesses.

HERMANN FRITZSCHE.

Witnesses:
 JOSEPH SÜTTERLIN,
 MADELINE SPENGLER.